Aug. 2, 1966    A. E. MANN ETAL    3,264,467
RADIANT ENERGY COLLIMATING SYSTEM
Original Filed April 1, 1964
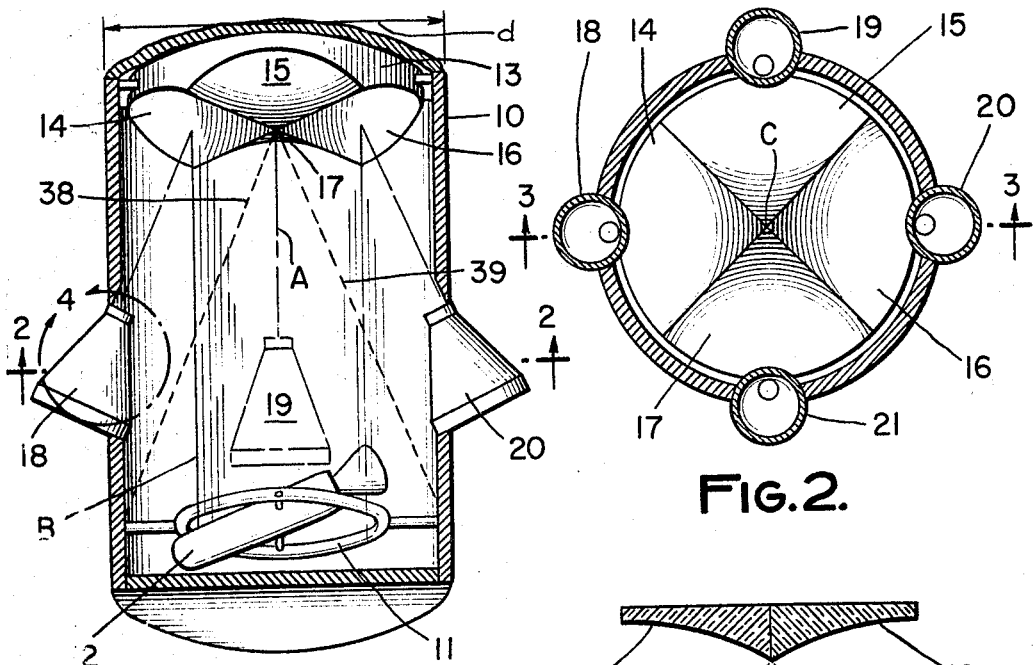
FIG.1.
FIG.2.
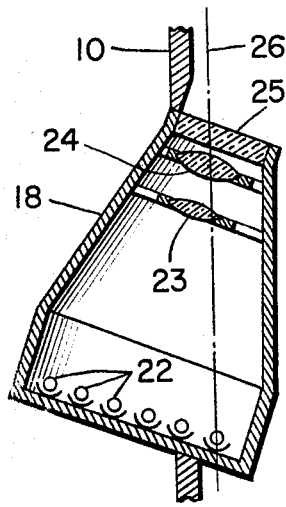
FIG.4.
FIG.3.
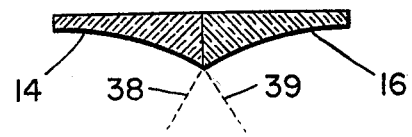
FIG.6.
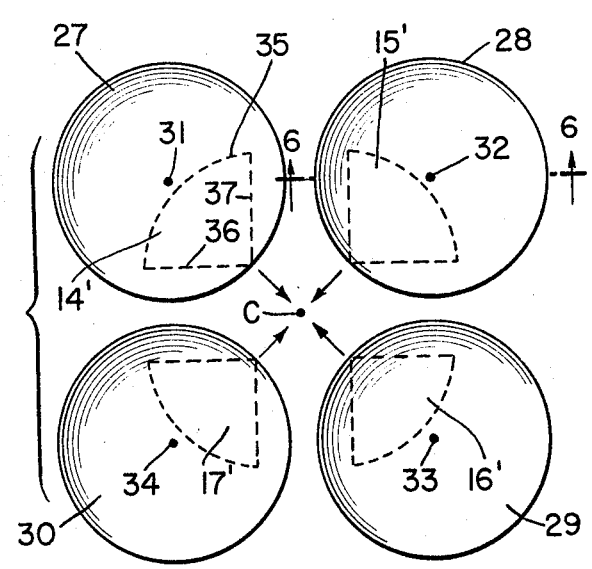
FIG.5.
INVENTORS
ALFRED E. MANN
RONALD BELL
HALBERT P. FISCHEL
DOUGLAS C. MARTIN
WALTER WALLIN
BY Elliott & Pastoriza
ATTORNEYS United States Patent Office
3,264,467
Patented August 2, 1966

3,264,467
RADIANT ENERGY COLLIMATING SYSTEM
Alfred E. Mann, West Hollywood, Ronald Bell, Granada Hills, Halbert P. Fischel, North Hollywood, Douglas C. Martin, San Fernando, and Walter Wallin, Tarzana, Calif., assignors to Spectrolab, a division of Textron Electronics, Inc., a corporation of California
Continuation of abandoned application Ser. No. 360,162, April 1, 1964. This application Dec. 6, 1965, Ser. No. 528,663
5 Claims. (Cl. 240—41.3)

This application is a continuation of our copending application, Serial No. 360,162, filed Apr. 1, 1964, now abandoned for Radiant Energy Collimating System, which copending application in turn was a continuation-in-part of application Serial No. 50,489, filed August 18, 1960, for Radiant Energy Collimating Apparatus, now abandoned.

This invention relates generally to the field of radiant energy and more particularly to an apparatus for providing a high intensity, uniform, relatively large cross-section collimated beam of radiant energy which may be used, by way of example, to simulate conditions in outer space in which the only major radiation present is that from a central luminary such as the sun.

Generally, energy from a distant source such as the sun presents a substantially planar wave front insofar as any particular object intercepting the energy is concerned. To simulate this condition on a test sample or vehicle of practical dimensions thus requires a collimated beam of energy with a cross section which may vary, for example, up to 100 feet or more and a uniformity in both depth and plane of the order of plus or minus five percent or better. The required intensity of the radiant energy can generally be controlled by simply increasing or decreasing the number or size of energy sources. The requirements of a collimated beam of given uniformity and large cross-section, however, are more difficult to realize.

If refractive optics are employed, it is very difficult to provide a large cross-section beam simply because of the difficulties in manufacturing a large lens which will support its own weight. Moreover, with any type of refractive system, radiant energy including both infrared and ultraviolet is difficult to collimate into a single beam.

The use of reflective optics affords a more feasible solution, but there are still involved problems of collimation and uniformity in the beam. Moreover, an important consideration in the use of any reflective type structure for producing a collimated beam simulating solar conditions in black space is the condition that any energy re-reflected from the test body or sample placed in the beam not be reimaged by the reflecting apparatus itself. In other words, to properly simulate outer space, any energy originating at or reflected from the sample must be completely attenuated or absorbed and not reflected back into the sample by the reflecting apparatus itself forming the collimated beam.

With the foregoing considerations in mind, it is a primary object of the present invention to provide a novel apparatus for collimating radiant energy into a relatively large cross-section beam having the required uniformity of depth and plane and in which any energy reflected or emitted from the illuminated test vehicle or sample will not be imaged back on the sample from the principal collimating apparatus.

Another object of the invention is to provide an improved collimating apparatus meeting the foregoing object which may be relatively economically constructed.

Briefly, these and other objects and advantages of this invention are attained by providing for small systems one reflector and for larger systems at least two and preferably a plurality of sector-shaped reflectors fitted together to provide a reflecting unit having a principal axis. Each of the reflectors themselves are provided with curved surface shapes preferably constituting portions of a paraboloid in which the axis of each paraboloid is laterally spaced from and parallel to the principal axis so that energy sources disposed at the focal points of the paraboloids will be reflected by the principal unit to provide a collimated beam of radiant energy. The axis of this collimated beam coincides with the referred to principal axis of the reflecting unit.

With the foregoing arrangement, there is defined a cone with cusped cross-section emanating from the principal apex of the reflecting unit demarking the common physical intersection point of the various individual reflectors. Any energy reradiated from a sample within this cone will not be imaged back onto the sample from the main reflecting unit but will be completely diverted and absorbed thus simulating the desired conditions of outer space.

A better understanding of the invention will be had by referring to the following drawings illustrating in schematic form one embodiment thereof, in which:

FIGURE 1 is a broken-away perspective view of a test chamber with which the collimating apparatus of the present invention may be employed;

FIGURE 2 is a plan view of the collimating apparatus itself;

FIGURE 3 is a cross-section taken in the direction of the arrows 3—3 of FIGURE 2;

FIGURE 4 is a schematic illustration of one type of radiant energy source corresponding to the source enclosed within the circular arrow 4 of FIGURE 1;

FIGURE 5 is a schematic diagram useful in explaining one means for constructing the collimating apparatus; and, FIGURE 6 is a cross-section taken in the direction of the arrows 6—6 in FIGURE 5.

Referring first to FIGURE 1, there is illustrated a test chamber 10 which may be generally cylindrically shaped and of a diameter $d$, for example, as large as 100 feet or more. As shown, the floor of the chamber includes a stand 11 supporting a test sample 12 which may constitute a space vehicle. To simulate outer space conditions, the chamber 10 is evacuated. The collimating apparatus is in the form of a reflecting unit 13 having a principal axis A which may coincide with the axis of the chamber 10 and arranged to project a beam of radiant energy B towards the sample 12 along axis A.

As shown in FIGURES 1 to 3, the unit 13 is formed from a plurality of individual sector-shaped reflectors 14, 15, 16, and 17 having their apices fitted together to define a common apex C on the axis A. The arcuate peripheries of the sectors preferably connect together to define a circle. The surface of each of the reflectors, in turn, defines a portion of a paraboloid having an axis parallel to the principal axis A of the reflector unit but spaced laterally therefrom by a distance at least equal to the radius of the unit 13.

With this arrangement, if effective radiant energy sources provided by suitable means such as schematically indicated at 18, 19, 20, and 21, respectively, are positioned at substantially the focal points of the respective portions of the paraboloids, there will be produced the collimated beam of radiant energy B of FIGURE 1. The means for providing each of these effective sources may be identical, and description of one will suffice for all.

Thus, referring to FIGURE 4, there is shown one means of providing an effective source of proper intensity comprising an array of lamps 22 for directing energy through a shaped lens 23 and projector lens 24 which is disposed at or near the focus of the paraboloid portion for the reflector 14 of FIGURE 1 depending upon the particular optics employed for providing the effective source. The side of the chamber 10 may include an inwardly directed window 25 disposed immediately ahead of the projecting lens 24 so that the source structure will not be exposed to the vacuum within the chamber. Alternatively, the lens 24 itself could constitute the window. The axis for the paraboloid section of the mirror 14 is indicated at 26 in FIGURE 4, and as shown, it will pass through the effective source, which in the embodiment shown coincides with the projector lens 24, the actual focal point on the axis 26 also coinciding with the position of the projecting lens.

In the design of the structure illustrated in FIGURE 4, the several lamps 22 are arranged in more or less concentric circles, each lamp being directed to pass all of its energy through the shaped lens 23. The shaped lens itself is of a shape corresponding to the parabolic section to be illuminated and this shape is thus projected by the projecting lens 24 so that the light energy from each lamp passing through the shaped lens 23 completely fills the sector-shaped parabolic mirror 14. By this design, a uniform, high intensity beam for illuminating the parabolic mirror can be achieved. In order words, since each of the lamps projects its light entirely through the shaped lens 23 to completely illuminate the parabolic surface, the total illumination of the parabolic surface represents the total intensities of the lamps. Thus, even though individual lamps may vary in intensity, the overall average provides a consistent and constant illumination.

The other source structures 19, 20, and 21 are similar in construction. Since the axes of the parabolic surfaces are laterally spaced from the principal beam axis A, there is ample room about the periphery of the chamber for according the various sources.

FIGURES 5 and 6 illustrate one means for forming one of the reflector units as described at 13 in FIGURES 1, 2, and 3. As shown, there may be initially provided four identical conventional parabolic reflectors 27, 28, 29, and 30 having parabolic axes 31, 32, 33, and 34, respectively. From the reflector 27, the sector-shaped reflector may be cut by swinging an arc 35 and connecting the ends of the arc by straight lines 36 and 37 forming a ninety degree angle with their bi-sector passing through the axis 31. The arc may pass through the axis 31 of the parabolic mirror 27 but is preferably spaced inwardly therefrom so that the axis of the sector falls outside of the physical mirror itself. By this arrangement, the energy source for the sector may be disposed exterior of the chamber.

Similar segments 15', 16', and 17' may be cut as indicated by the dashed lines from the blanks 28, 29, and 30 and the respective apices placed together to form a common apex C. From such a structure, it will be evident that the axes for the parabolic surface portions of the respective segments are spaced exterior of the periphery of the complete unit as described in conjunction with FIGURES 1, 2, and 3.

Referring once again to FIGURES 1 and 3, if normals are drawn to the surfaces immediately adjacent their common apex C, there will be defined a cone of cusped shaped cross-section opposite lateral sides of which are indicated by the dashed lines 38 and 39. Any radiated or reflected energy from any object, such as 12, within this cone will be lost completely, being reflected to the walls, and thus none can be reflected back to the object from the principal reflector unit 13. Any portion of a test specimen which falls outside of the cone, however, may have reflected energy or originating energy emanating therefrom reflected back onto itself. Accordingly, to simulate accurately conditions in outer space, the test sample should fall within the cone defined by the lines 38 and 39.

From the foregoing description, it will be evident that the present invention has provided a novel radiant energy collimating apparatus. While four segments have been described as constituting the complete reflector unit, it should be understood that three, two or even one segment or any greater number may be employed with a corresponding number of radiant energy sources associated therewith.

While only one embodiment has been set forth and described in connection with simulating the sun, it should be understood by one skilled in the art that there are many other applications for the collimating apparatus. The invention, therefore, is not to be thought of as limited to the one particular embodiment set forth merely for illustrative purposes.

The word "source" as used herein and in the attached claims, is defined to mean that effective secondary source of radiant energy which is established at the focal point of the paraboloid sections, provided by the lamps and projecting lens as described. This effective secondary source may coincide with the position of the projection lens or be established close thereto.

What is claimed is:

1. A radiant energy collimating system for simulating solar energy, including: a reflecting means constituting substantially a portion of a surface of revolution whose axis passes exteriorly to the boundary of said reflecting means; an enclosure defining a hermetically sealed chamber incorporating said reflecting means and having a principal axis passing within said chamber substantially parallel to and spaced from said axis of said surface of revolution, said chamber having means to receive a test body spaced from said reflecting means; and means for providing radiant energy disposed to one side of said principal axis substantially at the focus of said surface of revolution for directing radiant energy to said reflecting means so that energy reflected from said reflecting means is substantially in the form of a collimated beam directed along said principal axis, the distance between said means for receiving said test body and said reflecting means being such that normals to any surface portion of said reflecting means diverge away from said principal axis to define an area free of said normals so that any energy from said collimated beam reflected by said test body when positioned along said principal axis in said area is not directly returned to said test body by said reflecting means.

2. A radiant energy collimating system according to claim 1, in which said means for providing radiant energy includes: an array of lamps; and optical means for transferring energy from said array of lamps to said reflecting means whereby energy from each lamp illuminates said reflecting means and the total illumination of said reflecting means corresponds to the sum of the illumination of the individual lamps.

3. A radiant energy collimating system comprising: a plurality of reflecting means fitted together to form an assembly of sectors with substantially a common apex and with peripheries defining an outer boundary, each sector having a surface corresponding substantially to the shape of a portion of a paraboloid, the axis of which is radially spaced from said apex a distance at least equal to the radius of said boundary; means for providing radiant energy at the respective foci of the sectors to produce a collimated beam of radiant energy along a principal axis passing through said apex; an enclosure surrounding said reflecting means and defining a hermetically sealed chamber surrounding said principal axis; means for receiving a test body in said chamber spaced from said reflecting means, the distance between said means for receiving said test body and said reflecting means being such that normals to said surfaces of said reflecting means immediately adjacent said common apex define a cone having a cusped shaped cross-section and any energy reflected from said collimated beam by said test body within said cone is not directly returned to said body by any of said reflecting means.

4. A radiant energy collimating system according to claim 3, in which said means for providing radiant energy comprises sources of radiant energy at said respective foci of the reflecting means, each of said sources including: an array of lamps; and optical means for transferring radiant energy from said array of lamps to the associated collimating reflecting means whereby energy from each lamp illuminates the associated reflecting means and the total illumination of said reflecting means corresponds to the total number of said lamps.

5. A radiant energy collimating system according to claim 4, in which said optical means includes a shaped optical element with an effective boundary corresponding to the boundary of said collimating reflecting means.

No references cited.

NORTON ANSHER, *Primary Examiner.*